Patented Apr. 27, 1943

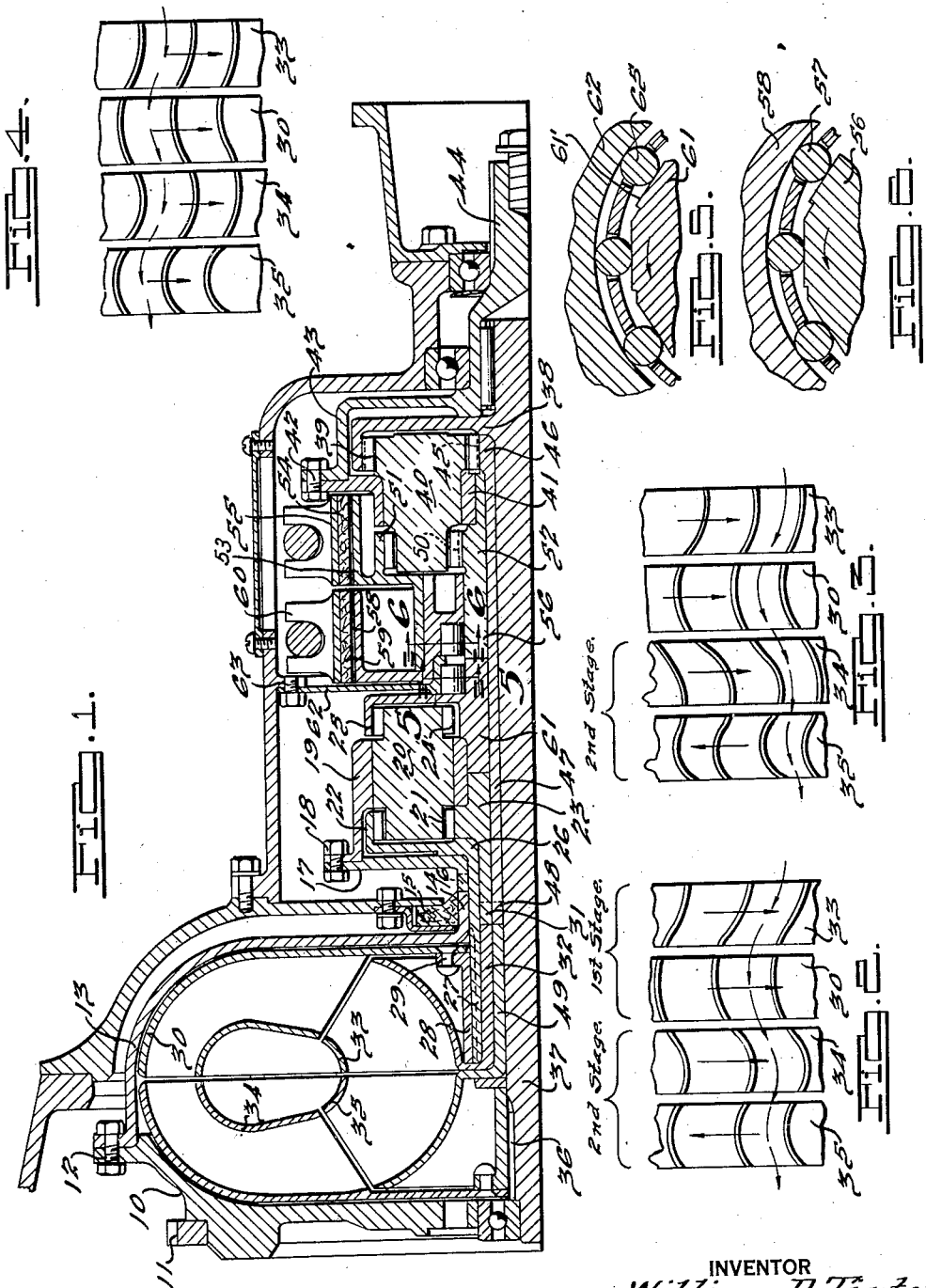

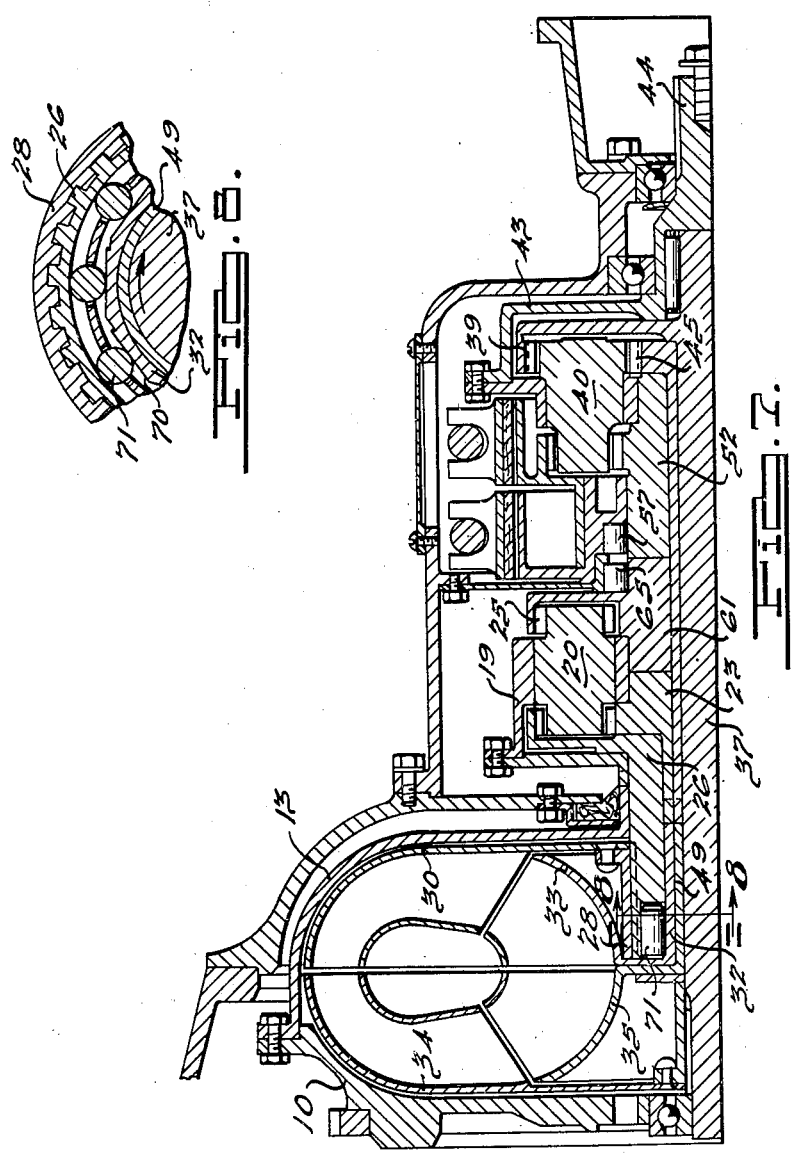

2,317,498

UNITED STATES PATENT OFFICE 2,317,498

HYDRODYNAMIC TRANSMISSION

William D. Tipton, Baltimore, Md.

Application December 20, 1941, Serial No. 423,789

38 Claims. (Cl. 74—189.5)

This application is a continuation-in-part of my copending application, Serial No. 359,014, filed September 30, 1940.

This invention pertains to power transmissions of the hydrodynamic type and it relates in particular to improvements in hydrodynamic transmissions adapted for use in automotive vehicles.

It is the principal object of the present invention to provide an improved form of hydrodynamic transmission which shall have higher operating efficiency and better acceleration characteristics than those of the prior art.

An additional object is to provide a transmission of the aforesaid type which includes two stages of torque conversion in addition to direct drive in its operating range.

A further object of the invention is to provide in such a transmission, novel control mechanism operable to provide the torque conversion ratio best suited to the vehicle operating conditions at any particular time, this control mechanism being operable automatically in response to torque demand on the output shaft.

A still further object is to provide a fluid type transmission wherein relatively great torque multiplication is obtained with small curvature vanes thereby making possible the use of pressed metal vanes with resulting economy of manufacture as well as increased operating efficiency.

A still further object is to provide in a transmission of the aforesaid type, a pair of impeller or pump wheels geared together in such manner that one of the wheels is adapted to act as an auxiliary guide or reaction wheel under certain conditions of vehicle operation.

Additional objects and advantages of the invention will become apparent from the following description which refers to the accompanying drawings, similar reference characters in said drawings designating corresponding parts in the description.

In the drawings, Fig. 1 is a longitudinal elevational view, partly in section, of my improved transmission.

Fig. 2 is a diagram of the hydraulic circuit during the first stage of torque conversion.

Fig. 3 is a similar diagram showing conditions during the second stage of torque conversion.

Fig. 4 is a diagram of conditions during direct drive.

Fig. 5 is a section along line 5—5 of Fig. 1.

Fig. 6 is a section along line 6—6 of Fig. 1.

Fig. 7 is a longitudinal sectional view of a modified form of the invention.

Fig. 8 is a section along line 8—8 of Fig. 7.

The input structure of the transmission (referring to Figs. 1 to 6, inclusive) includes a flywheel 10 which is adapted to be driven by the engine crankshaft (not shown). The flywheel 10 carries the usual starter gear 11 and is fastened by bolts 12 to a housing member 13 which partially encloses the hydraulic unit. Housing 13 terminates in a cylindrical portion 14 which cooperates with a suitable seal 15 to prevent escape of fluid from the hydraulic unit. The portion 14 is connected by means of a dog clutch 16, to an annular member 17 which, in turn, is bolted at 18 to a planet carrier 19.

The planet carrier 19 rotatably carries a pinion 20 which forms part of a compound planetary gearset. The pinion 20 has two sets of teeth, the forward set 21 meshing with an annulus gear 22 and a sun gear 23, and the rear set 24 meshing with an annulus gear 25.

The annulus gear 22 is formed integrally with a sleeve 26 which is splined at 27 to a hub 28 to which is riveted by rivets 29 a vaned impeller or pump wheel 30. The sun gear 23 is connected by dog clutch 31 to the sleeve-like extension 32 of a second vaned impeller 33, the latter being positioned in series relation relative to the main impeller 30.

Also positioned in series relation with each other and with the wheels 30 and 33 are a pair of vaned hydraulic elements designated 34 and 35 respectively. The wheel 34 is adapted to function as a runner or turbine wheel and is splined at 36 to a shaft 37. The latter extends throughout the length of the transmission and is provided with an enlarged annular toothed portion 38 adjacent the rear end which forms the annulus gear 39 of a second compound planetary gearset.

The second or rear gearset includes a pinion 40 which is rotatably carried by a carrier 41, the latter being bolted at 42 to the enlarged hollowed-out forward extension 43 of the output or tail shaft 44. The latter is adapted to be connected to the rear axle of the vehicle for driving the same.

The pinion 40 is provided with two sets of teeth 45 and 50 of respectively different pitch diameters. The teeth 45, of larger diameter, mesh with the teeth of annulus gear 39 and sun gear 46 respectively. The gear 46 is formed integrally on the rear end of a sleeve 47 which is connected by a dog clutch 48 to a sleeve-like hub member 49 which carries the hydraulic element 35. The teeth 50, of smaller pitch diameter, mesh with an annulus gear 51 and a sun gear 52. The annulus gear 51 is integrally carried by a brake drum 53 which is adapted to be rotatively restrained by a brake band 54 under the control of brake applying mechanism 55. The sun gear 52 is rotatable on the sleeve 47 and has a forwardly extending sleeve portion 56 on which is formed a plurality of cams (Fig. 6). A set of overrunning rollers 57 is disposed between the portion 56 and the cylindrical surface of a brake drum 58 which is adapted for engagement by the brake band 59 under control of brake applying mechanism 60. When the band 59 is set, rollers 57 prevent reverse rotation of sun gear 52 while permitting free forward rotation thereof.

The annulus gear 25 which meshes with the rear teeth of the pinion 20 has an integral hub 61 formed with cam surfaces 61' which form one element of an overrunning brake device similar to that just described. The second element thereof comprises an annular brake element 62, bolted to the casing at 63 and provided with a cylindrical portion with which the rollers 65 are adapted to engage and thereby lock gear 25 against reverse rotation.

The operation of the device is as follows:

To start the vehicle from rest, brake band 59 is set whereupon torque is supplied to planet carrier 19 from flywheel 10. Due to the shape of the vanes of wheel 30 (see Fig. 2) at the start there will be greater drag on wheel 30 than on wheel 35 therefore, as carrier 19 is rotated, wheel 33 will be rotated at a speed greater than engine speed and the reaction on wheel 30 will tend to rotate it in reverse. This tendency will cause the rollers 65 to lock up against the stationary member 62 and reverse rotation of wheel 30 will be prevented. The wheel 30 will therefore function as a reaction wheel.

The fluid delivered to wheel 34 will rotate the latter forwardly and torque will thus be transmitted to annulus gear 39 of the rear planetary gearset. Forward rotation of gear 39 will tend to rotate sun gears 46 and 52 in reverse. Sun gear 52 will be prevented from reverse rotation by lock-up of rollers 57 against brake drum 58, thus carrier 41 will be rotated forwardly and torque will be imparted through tail shaft 44 to the vehicle drive wheels (not shown). At the same time, the difference in pitch diameter of sun gears 46 and 52 will cause sun gear 46 to be rotated in reverse thereby causing reverse rotation of hydraulic wheel 35. The wheel 35 thus functions as a second reaction wheel and a second stage of hydraulic torque conversion is provided which acts simultaneously with the first stage.

Fig. 2 illustrates diagrammatically the fluid flow in the hydraulic unit under the above described conditions. It may thus be seen that the vehicle is started with two stages of hydraulic torque multiplication acting in series with one stage of mechanical torque conversion, the latter being obtained in the rear planetary gearing.

Upon acceleration of the car accompanied by a decrease in torque demand on shaft 37, a corresponding decrease in reaction drag on wheel 30 will occur. As the reaction force on wheel 30 decreases, the latter will speed up causing impeller 33 to slow down until the two are rotating at the same speed. There will, under these conditions, be a tendency for the front planetary set to rotate forwardly at engine speed in locked-up condition which action is permitted by overrun of rollers 65 which allow gear 25 to idle in forward rotation.

Under these conditions of operation (illustrated diagrammatically in Fig. 3), the transmission is operating in the second stage of hydraulic torque multiplication combined with the stage of mechanical torque multiplication. This will result in the vehicle being driven forwardly at increased speed and has the effect of a shift to second or intermediate speed in conventional transmissions.

Continued acceleration of the vehicle accompanied by further decrease in torque demand on shaft 44 results in a falling off of the reaction force on the vanes of guide wheel 35 and a decrease in slip between runner 34 and impellers 30 and 33. When the torque demand on shaft 44 has reached a value approximately equal to the torque supplied by impellers 30 and 33, the reaction on guide wheel 35 will have entirely disappeared and the outflow from the vane passage of runner 34 will become forwardly directed, applying forward torque to wheel 35. The guide wheel 35 will then be rotated forwardly and the rollers 57 will release sun gear 52 for forward rotation. This causes equalization of forces in the rear planetary set whereupon the gearset rotates as a unit in locked-up condition and a direct drive condition obtains throughout the transmission. This condition of operation in the hydraulic unit is diagrammatically illustrated in Fig. 4 and corresponds to third speed in conventional transmissions.

It will be noted that under these conditions, the wheels 30 and 33 function as input wheels or impellers and the wheels 34 and 35 function as output wheels or runners.

Reverse drive is obtained by release of brake band 59 and setting of brake band 55. Annulus gear 51 will then be locked against rotation and application of forward driving torque to annulus gear 39 will cause forward rotation of pinion 40, but because of the difference in pitch diameter of the teeth 45 and 50 of the pinion 40, reverse rotation will be imparted to carrier 41 and tail shaft 44, the teeth 50 rolling around annulus gear 51 which also acts as a rack. The vehicle will now be driven in reverse with the hydraulic unit operating in its first or double conversion stage, as illustrated diagrammatically in Fig. 2. This torque multiplication is increased by that resulting from the difference in pitch diameters between annulus gears 39 and 51. If the vehicle is driven in reverse under conditions of speed and torque demand sufficient to cause equalization of forces in the front planetary gearset, a "shift" to the second stage of torque conversion (Fig. 3) will be obtained in the manner described above. Direct drive in reverse can never be obtained, however, because brake band 55 maintains annulus 51 in stationary conditions which causes guide wheel 35 to rotate in reverse at all times during reverse drive.

Referring now to Figs. 7 and 8, it will be seen that in the form of the invention illustrated by these figures, a third overrunning clutch device is operatively disposed between the wheels 30 and 33. In these figures, similar parts have been given the same reference numerals used to identify them in the above description of Figs. 1 to 6, inclusive.

This additional overrunning clutch includes the cams 70 which are formed on the sleeve member 32, and rollers 71 which are retained in spaced relationship by the usual cage.

The disposition of the cams and rollers is such that the wheel 33 can freely overrun the wheel 30 as in the first stage of torque conversion described above. The wheel 30, however, cannot overrun the wheel 33, but is clutched to it by the rollers 71 in response to such tendency to overrun.

This arrangement of parts does not alter the operation of the transmission, but is advantageous in that it prevents "hunting" of the wheels 30 and 33 which sometimes occurs when the change from first stage to second stage of torque conversion takes place.

In practice, the forward planetary gearset is ratioed such that there will be a slight tendency for the wheel 30 to overrun the wheel 33 under normal conditions of torque demand. Thus, there will be a positive lock-up between these wheels after acceleration of the vehicle to the second conversion stage and all "hunting" will be avoided.

It will thus be seen that I have provided a power transmission that is fully automatic in operation and which provides a range of speed ratios equal to that provided in conventional sliding gear transmissions. While but two specific embodiments of my invention have been illustrated and described, it is desired to point out that the invention may assume many different forms and it is not desired to limit the invention in its broader aspects except as set forth in the claims appended hereto.

I claim:

1. In a hydrodynamic transmission having input and output structures, a planet carrier carried by said input structure; a planet pinion carried by said carrier; sun and annulus gears respectively meshing with said pinion; a pair of vaned hydraulic wheels disposed in juxtaposition and connected respectively to said sun and annulus gears for rotation therewith; a vaned runner wheel connected to the output structure and disposed in such relation with respect to one of the aforesaid hydraulic wheels that it receives the discharge therefrom; a second annulus gear in mesh with said pinion; and means for restraining rotation of said latter gear in the direction of rotational tendency thereof caused by fluid drag on said hydraulic wheels.

2. In a hydrodynamic transmission having input and output structures, a planet carrier carried by said input structure; a planet pinion carried by said carrier; sun and annulus gears respectively meshing with said pinion; a pair of vaned hydraulic wheels disposed in juxtaposition and connected respectively to said sun and annulus gears for rotation therewith; a vaned runner wheel connected to the output structure and disposed in such relation with respect to one of the aforesaid hydraulic wheels that it receives the discharge therefrom; a second annulus gear in mesh with said pinion; and means for preventing rotation of said latter gear in the direction of rotational tendency thereof caused by fluid drag on said hydraulic wheels including releasable means permitting rotation of said gear in the opposite direction.

3. In a hydrodynamic transmission having input and output structures, a planet carrier carried by said input structure; a planet pinion carried by said carrier; sun and annulus gears respectively meshing with said pinion; a pair of vaned hydraulic wheels disposed in juxtaposition and connected respectively to said sun and annulus gears for rotation therewith; a vaned runner wheel connected to the output structure and disposed in such relation with respect to one of the aforesaid hydraulic wheels that it receives the discharge therefrom; a second annulus gear in mesh with said pinion; and overrunning control means for locking said second annulus gear against reverse rotation, said means permitting free forward rotation of said gear in response to a decrease in slip between said runner and said wheels.

4. In a hydrodynamic transmission having input and output structures, a planet carrier carried by said input structure; a planet pinion carried by said carrier; sun and annulus gears respectively meshing with said pinion; a pair of vaned hydraulic wheels disposed in juxtaposition and connected respectively to said sun and annulus gears for rotation therewith; a vaned runner wheel connected to the output structure and disposed in such relation with respect to one of the aforesaid hydraulic wheels that it receives the discharge therefrom; a second annulus gear in mesh with said pinion; a member fixed against rotation; and overrunning brake means associated with said member and second annulus gear and operable to lock the latter against reverse rotation while permitting free forward rotation thereof.

5. In a hydrodynamic transmission having input and output structures, a planet carrier carried by said input structure; a planet pinion carried by said carrier; sun and annulus gears respectively meshing with said pinion; a pair of vaned hydraulic wheels connected respectively to said sun and annulus gears for rotation therewith, said wheels having their respective inlet and outlet portions disposed at different radial distances from the rotational axis of said wheels; a vaned runner wheel connected to the output structure and arranged to receive the discharge from one of the aforesaid wheels, a second annulus gear in mesh with said pinion; and means for locking said second annulus gear against rotation in the direction of rotational tendency thereof caused by the distribution of fluid drag on said hydraulic wheels.

6. In a hydrodynamic transmission having input and output structures, a planet carrier carried by said input structure; a planet pinion carried by said carrier; sun and annulus gears respectively meshing with said pinion; a pair of vaned hydraulic wheels connected respectively to said sun and annulus gears for rotation therewith, said wheels having their respective inlet and outlet portions disposed at different radial distances from the rotational axis of said wheels; a vaned runner wheel connected to the output structure and arranged to receive the discharge from one of the aforesaid wheels; a second annulus gear in mesh with said pinion; and means for locking said second annulus gear against rotation in the direction of rotational tendency thereof caused by the distribution of fluid drag on said hydraulic wheels during the period of slip of said runner relative to said wheels.

7. In a hydrodynamic transmission having input and output structures, a planet carrier carried by said input structure; a planet pinion carried by said carrier; sun and annulus gears respectively meshing with said pinion; a first hydraulic wheel drivingly connected with said sun gear; a second hydraulic wheel drivingly connected with said annulus gear and arranged to receive the discharge from said first wheel; the inlet and outlet portions of said first and second wheels being disposed respectively at different distances radially from the rotational axis thereof; a second annulus gear in mesh with said pinion; and means for preventing reverse rotation of said second annulus gear whereby said gear will function as a reaction-taking element.

8. In a hydrodynamic transmission having input and output structures, a planet carrier carried by said input structure; a planet pinion carried by said carrier; sun and annulus gears respectively meshing with said pinion; a first hydraulic wheel drivingly connected with said sun gear; a second hydraulic wheel drivingly connected with said annulus gear and arranged to receive the discharge from said first wheel; the discharge portion of said second wheel being disposed at greater radial distance from the rotational axis than the discharge portion of said first wheel; a runner wheel arranged to receive the discharge from said second wheel; a second annulus gear in mesh with said pinion; means for locking said second annulus gear against reverse rotation whereby said second wheel is caused to remain stationary and said first wheel is rotated at overspeed during the slip period of said runner.

9. In a hydrodynamic transmission having input and output structures, a planet carrier carried by said input structure; a planet pinion carried by said carrier; sun and annulus gears respectively meshing with said pinion; a first hydraulic wheel drivingly connected with said sun gear; a second hydraulic wheel drivingly connected with said annulus gear and arranged to receive the discharge from said first wheel; the discharge portion of said second wheel being disposed at greater radial distance from the rotational axis than the discharge portion of said first wheel; a runner wheel arranged to receive the discharge from said second wheel; a second annulus gear in mesh with said pinion; means for locking said second annulus gear against reverse rotation whereby said second wheel is caused to remain stationary and said first wheel is rotated at overspeed during the slip period of said runner; said locking means being releasable to permit forward rotation of said second annulus gear in response to tendency thereof caused by decrease in slip between said runner and said first wheel.

10. In a hydrodynamic transmission having input and output structures, a planet carrier carried by said input structure; a planet pinion carried by said carrier; sun and annulus gears respectively meshing with said pinion; a first hydraulic wheel drivingly connected with said sun gear; a second hydraulic wheel drivingly connected with said annulus gear and arranged to receive the discharge from said first wheel; the discharge portion of said second wheel being disposed at greater radial distance from the rotational axis than the discharge portion of said first wheel; a runner wheel arranged to receive the discharge from said second wheel; a second annulus gear in mesh with said pinion; means for locking said second annulus gear against reverse rotation whereby said second wheel is caused to remain stationary and said first wheel is rotated at overspeed during the slip period of said runner; said locking means being releasable to permit forward rotation of said second annulus gear in response to tendency thereof caused by decrease in slip between said runner and said first wheel thereby to permit rotation of all of said wheels at substantially identical speed.

11. In a power transmission, a driving structure; a driven structure; a pair of hydraulic runner wheels drivingly connected to the driven structure; a pair of hydraulic impeller wheels disposed in driving relation relative to said runner wheels; means drivingly connecting the driving structure with said hydraulic impeller wheels including means for distributing the torque of said driving structure between said hydraulic wheels inversely in accordance with the hydraulic drag imposed thereon; and means drivingly connecting the runner wheels with the driven structure including means for applying the torque of said wheels to said structure while said wheels are rotating at different speeds relatively to one another.

12. In a power transmission, a driving structure; a driven structure; a pair of turbine wheels connected to the driven structure; a pair of pump wheels arranged in driving relationship relative to said turbine wheels; means for connecting said pump wheels with the driving structure including means for distributing the drive of said structure between said pump wheels in a ratio inversely proportioned to the hydraulic drag imposed thereon; and means connecting said turbine wheels with the driven structure arranged to permit said wheels to vary in speed relatively to one another whereby one of said wheels may act as a guide wheel.

13. The combination set forth in claim 12 wherein the connecting means between the pump wheels and driving structure comprises a planetary gearset having the planet carrier thereof connected to said driving structure, the driven sun gear thereof connected to one of said pump wheels and the driven annulus gear thereof connected to the other of said pump wheels.

14. The combination set forth in claim 12 wherein the connecting means between the pump wheels and driving structure comprises a planetary gearset having the planet carrier thereof connected to said driving structure, the driven sun gear thereof connected to one of said pump wheels and the driven annulus gear thereof connected to the other of said pump wheels; and means operatively associated with said gearset for locking one of said driven gears against reverse rotation thereby to provide a reaction point for said gearset.

15. In a power transmission, a driving structure; a driven structure; a turbine wheel connected to the driven structure; first and second pump wheels arranged in driving relationship with said turbine wheel, said pump wheels having their outlet portions disposed at respectively different distances radially from the axis of rotation thereof, a planet gear carrier drivingly connected to the driving structure; planet pinions carried by said carrier; a sun gear in mesh with said pinions and connected to said first pump wheel; an annulus gear in mesh with said pinions and connected to said second pump wheel; means for preventing reverse rotational tendency of said annulus gear caused by difference in fluid drag on said pump wheels during the period of slip of said turbine wheel relative to said pump wheels whereby said second pump wheel is adapted to function as a reaction wheel during acceleration of said turbine wheel.

16. The combination set forth in claim 15 wherein the means for preventing reverse rotational tendency of the annulus gear comprises a second annulus gear disposed in mesh with said planet pinion and brake means for locking said second annulus gear against reverse rotation while permitting free forward rotation thereof, whereby the second pump wheel is permitted to rotate forwardly at the speed of the first pump wheel in response to falling off of reaction on said second wheel.

17. In a hydraulic power transmission, a driving structure; a driven structure; a turbine wheel connected to the driven structure; a pair of pump wheels connected to the driving structure; a reaction wheel; the disposition of said wheels being such that the hydraulic fluid passes successively through said pump wheels to said turbine wheel, thence to said reaction wheel; means interposed in the drive connection between the pump wheels and driving structure for permitting relative rotation between said wheels during driving including means for preventing reverse rotation thereof whereby one of said wheels may act as a reaction wheel during initial acceleration of the turbine wheel; said means being operable to permit said wheel to rotate in unison with the other pump wheel in response to decrease in the slip of the turbine wheel thereby to provide a step-up in ratio through said transmission.

18. The combination set forth in claim 17 wherein means is provided for releasing the reaction wheel for forward rotation in response to shift in the direction of the impinging fluid caused by cessation of slip of the turbine wheel, thereby to provide a step-up to direct drive.

19. In a hydraulic power transmission, a driving structure; a driven structure; a turbine wheel connected to the driven structure; first and second pump wheels connected to the driving structure; a reaction wheel; the disposition of said wheels being such that the hydraulic fluid passes in succession through the first pump wheel, the second pump wheel, the turbine wheel, thence through the reaction wheel to the first pump wheel; a planetary gearset interposed in the drive connection to said pump wheels and operable to distribute the drive between said wheels in inverse proportion to the hydraulic drag imposed on said wheels by the rotational resistance of said turbine wheel; a fixed element operatively associated with said gearset for resisting reverse rotational tendency of said second pump wheel whereby the latter is caused to function as a reaction wheel thereby to provide one stage of torque multiplication; and means for preventing reverse rotational tendency of said reaction wheel thereby to provide a second stage of torque multiplication.

20. The combination set forth in claim 19 wherein the planetary gearset is operable to permit the pump wheels to rotate in unison in response to decrease in slip of the turbine wheel thereby to effect a step-up in driving ratio.

21. The combination set forth in claim 19 wherein the planetary gearset is operable to permit the pump wheels to rotate in unison in response to decrease in slip of the turbine wheel thereby to effect a step-up in driving ratio; and means for permitting forward rotation of the reaction wheel in response to reversal of fluid flow impinging thereon thereby to effect a second step-up in driving ratio.

22. The combination set forth in claim 19 wherein a planetary gearset is interposed in the drive connection between the turbine wheel and the output shaft, said gearset being operable to provide a stage of mechanical torque multiplication during operation of both stages of hydraulic torque multiplication.

23. The combination set forth in claim 19 wherein a planetary gearset is interposed in the drive connection between the turbine wheel and the output shaft, said gearset being operable to provide a stage of mechanical torque multiplication during operation of both stages of hydraulic torque multiplication; and means operably associated with said gearset for establishing reverse rotation of the output during forward rotation of the input shaft.

24. The combination set forth in claim 19 wherein a planetary gearset is interposed in the drive connection between the turbine wheel and the output shaft; said gearset including an annulus gear connected to the turbine wheel; a planet gear carrier connected to the output shaft and a sun gear connected to the reaction wheel; a second sun gear meshing with the planet gears of said gearset; means for locking said second sun gear against reverse rotation thereby to provide a reaction point for said reaction wheel during the slip period; said locking means being releasable to permit lock-up of the planetary gearset in 1 to 1 ratio in response to forward rotation of the reaction wheel.

25. In a power transmission, a driving structure; a pair of hydraulic pump wheels; means including a planetary gearset for connecting said pump wheels with the driving structure; a driven structure; a pair of hydraulic runner wheels; means including a planetary gearset for connecting said runner wheels with the driven structure; the said planetary gearsets being so constructed and arranged with respect to said wheels and structures that said wheels may vary in speed with respect to one another and said structures in accordance with the hydraulic drag imposed thereon.

26. The combination set forth in claim 25 wherein overrunning brakes are respectively operably associated with one of said pump wheels and one of said runner wheels for restraining reverse rotational tendency thereof, said brakes being releasable for permitting substantially synchronous forward rotation of said wheels.

27. In a hydrodynamic transmission having input and output structures, a planet carrier carried by said input structure; a planet pinion carried by said carrier; sun and annulus gears respectively meshing with said pinion; a pair of vaned hydraulic wheels disposed in juxtaposition and connected respectively to said sun and annulus gears for rotation therewith; a vaned runner wheel connected to the output structure and disposed in such relation with respect to one of the aforesaid hydraulic wheels that it receives the discharge therefrom; a second annulus gear in mesh with said pinion; means for restraining rotation of said latter gear in the direction of rotational tendency thereof caused by fluid drag on said hydraulic wheels, and clutch means operatively associated with said pair of vaned wheels for clutching the same together.

28. In a hydrodynamic transmission having input and output structures, a planet carrier carried by said input structure; a planet pinion carried by said carrier; sun and annulus gears respectively meshing with said pinion; a pair of vaned hydraulic wheels disposed in juxtaposition and connected respectively to said sun and annulus gears for rotation therewith; a vaned runner wheel connected to the output structure and disposed in such relation with respect to one of the aforesaid hydraulic wheels that it receives the discharge therefrom; a second annulus gear in mesh with said pinion; means for preventing rotation of said latter gear in the direction of rotational tendency thereof caused by fluid drag on said hydraulic wheels including releasable means permitting rotation of said gear in the opposite direction, and clutch means operatively associated with said pair of vaned wheels for clutching the same together.

29. In a hydrodynamic transmission having input and output structures, a planet carrier carried by said input structure; a planet pinion carried by said carrier; sun and annulus gears respectively meshing with said pinion; a pair of vaned hydraulic wheels connected respectively to said sun and annulus gears for rotation therewith, said wheels having their respective inlet and outlet portions disposed at different radial distances from the rotational axis of said wheels; a vaned runner wheel connected to the output structure and arranged to receive the discharge from one of the aforesaid wheels, a second annulus gear in mesh with said pinion; means for locking said second annulus gear against rotation in the direction of rotational tendency thereof caused by the distribution of fluid drag on said hydraulic wheels, and means for automatically clutching said pair of wheels together in response to tendency of the wheel of larger diameter to overrun the other wheel.

30. In a hydrodynamic transmission having input and output structures, a planet carrier carried by said input structure; a planet pinion carried by said carrier; sun and annulus gears respectively meshing with said pinion; a pair of vaned hydraulic wheels connected respectively to said sun and annulus gears for rotation therewith, said wheels having their respective inlet and outlet portions disposed at different radial distances from the rotational axis of said wheels; and an overrunning clutch operatively disposed between said wheels for clutching them together under certain conditions of torque demand.

31. In a hydrodynamic transmission having input and output structures, a planet carrier carried by said input structure; a planet pinion carried by said carrier; sun and annulus gears respectively meshing with said pinion; a first hydraulic wheel drivingly connected with said sun gear; a second hydraulic wheel drivingly connected with said annulus gear and arranged to receive the discharge from said first wheel; the inlet and outlet portions of said first and second wheels being disposed respectively at different distances radially from the rotational axis thereof; a second annulus gear in mesh with said pinion; means for preventing reverse rotation of said second annulus gear whereby said gear will function as a reaction-taking element, and clutch means operatively disposed between said wheels operable automatically in response to tendency of the second wheel to overrun the first wheel for clutching said wheels together.

32. In a hydrodynamic transmission having input and output structures, a planet carrier carried by said input structure; a planet pinion carried by said carrier; sun and annulus gears respectively meshing with said pinion; a first hydraulic wheel drivingly connected with said sun gear; a second hydraulic wheel drivingly connected with said annulus gear and arranged to receive the discharge from said first wheel; the discharge portion of said second wheel being disposed at greater radial distance from the rotational axis than the discharge portion of said first wheel; a runner wheel arranged to receive the discharge from said second wheel; a second annulus gear in mesh with said pinion; means for locking said second annulus gear against reverse rotation whereby said second wheel is caused to remain stationary and said first wheel is rotated at overspeed during the slip period of said runner, and an overrunning clutch operatively disposed between said first and second wheels operable to permit said first wheel to overrun said second wheel and to clutch said second wheel to said first wheel upon tendency of the former to overrun the latter.

33. In a power transmission, a driving structure; a driven structure; a hydraulic runner drivingly connected to the driven structure; a pair of hydraulic members disposed in driving relation relative to said runner; means drivingly connecting the driving structure with said hydraulic members including means for distributing the torque of said driving structure between said hydraulic members inversely in accordance with the hydraulic drag imposed thereon, and clutch means operatively associated with said members for clutching them together for synchronous rotation.

34. In a power transmission, a driving structure; a driven structure; a turbine wheel connected to the driven structure; a pair of pump wheels arranged in driving relationship relative to said turbine wheel; means for connecting said pump wheels with the driving structure including means for distributing the drive of said structure between said pump wheels in a ratio inversely proportioned to the hydraulic drag imposed thereon, and clutch means operatively associated with said wheels operable automatically in response to cessation of slip between said wheels for clutching them together.

35. The combination set forth in claim 34 wherein the connecting means between the pump wheels and driving structure comprises a planetary gearset having the planet carrier thereof connected to said driving structure, the driven sun gear thereof connected to one of said pump wheels and the driven annulus gear thereof connected to the other of said pump wheels.

36. The combination set forth in claim 34 wherein the connecting means between the pump wheels and driving structure comprises a planetary gearset having the planet carrier thereof connected to said driving structure, the driven sun gear thereof connected to one of said pump wheels and the driven annulus gear thereof connected to the other of said pump wheels; and means operatively associated with said gearset for restraining one of said driven gears from reverse rotation thereby to provide a reaction point for said gearset.

37. In a hydraulic power transmission which includes a pair of input wheels and a pair of output wheels, said wheels being disposed in series relation; differential means drivingly connecting said input wheels, and differential means drivingly connecting said output wheels.

38. In a hydraulic power transmission, a driving structure; a driven structure; a pair of input wheels; differential means for drivingly connecting said input wheels with each other and with said driving structure; a pair of output wheels; and differential means drivingly connecting said output wheels with each other and with said driven structure.

WILLIAM D. TIPTON.